May 19, 1964 A. E. SHAW 3,133,345
METHOD OF ASSEMBLING A SINKER TO ANY PART OF A FISHING LINE
Original Filed Nov. 9, 1959
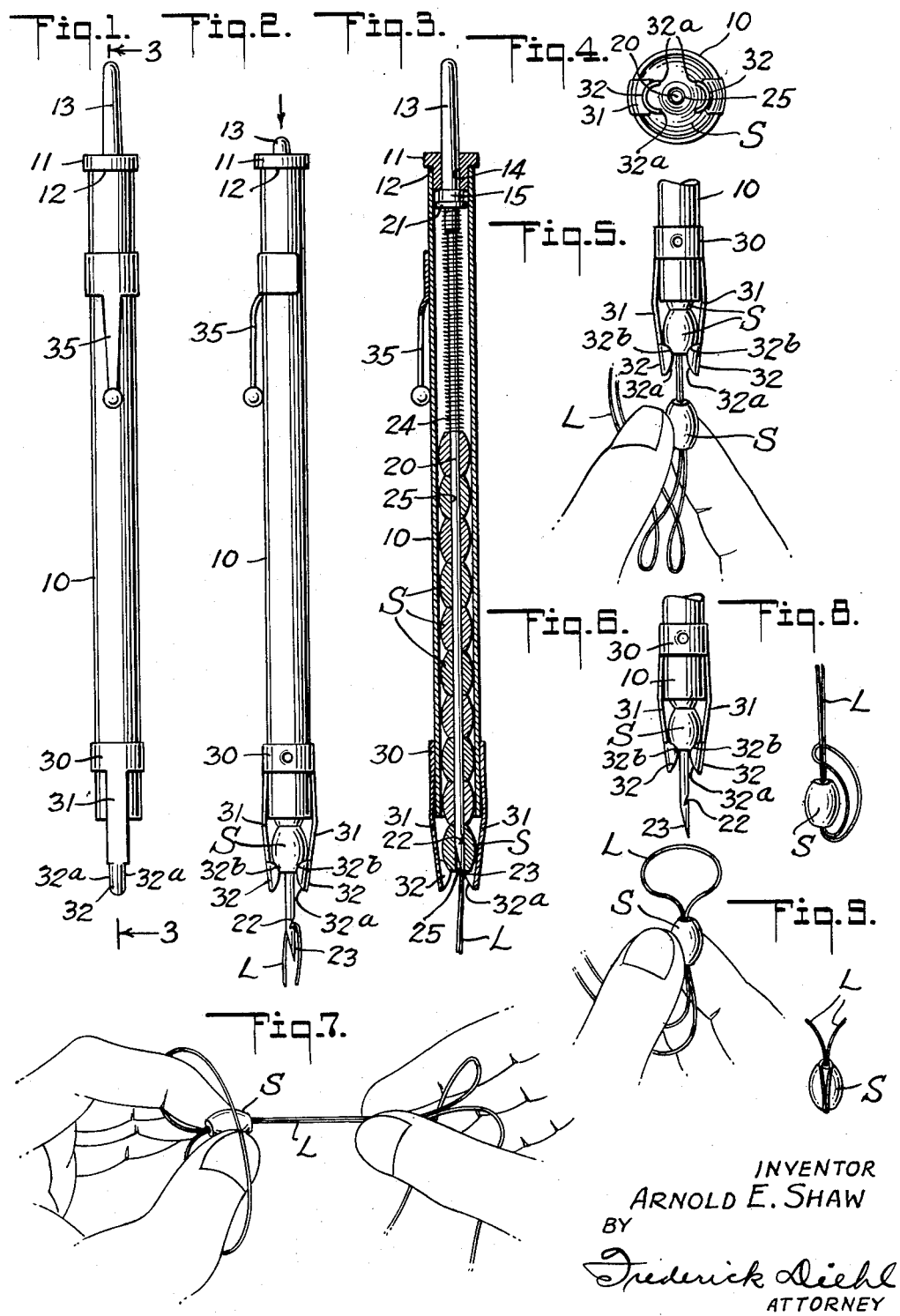
INVENTOR
ARNOLD E. SHAW
BY
Frederick Diehl
ATTORNEY

United States Patent Office 3,133,345
Patented May 19, 1964

3,133,345
METHOD OF ASSEMBLING A SINKER TO ANY PART OF A FISHING LINE
Arnold E. Shaw, 3300 W. Florence Ave., Los Angeles, Calif., assignor of one-half to Charles J. Curtiss, Los Angeles, Calif.
Original application Nov. 9, 1959, Ser. No. 851,906, now Patent No. 3,067,499, dated Dec. 11, 1962. Divided and this application July 5, 1962, Ser. No. 207,685
2 Claims. (Cl. 29—433)

This application is a division of my co-pending application for patent on a Sinker Applying Method and Device, Serial No. 851,906, filed November 9, 1959 and issued on December 11, 1962 as Patent No. 3,067,499.

My invention relates generally to the art of angling and more particularly to fishing lines.

An object of my present invention is to provide a method of applying a sinker to any part of a fishing line with the utmost ease and dispatch and in a manner to obviate the use of split rivets and other weight adding attachments with their attendant disadvantages.

Another object of my invention is to provide a sinker applying method which not only facilitates and expedites the applying operation but utilizes a sinker of conventional or standard construction obtainable wherever fishing supplies are sold, and enables a sinker to be instantly removed from the line without cutting the line or damaging the sinker, to the end that the sinker may be reused indefinitely.

With these and other objects in view, my invention resides in the method set forth in the following specification and particularly pointed out in the appended claims.

In the accompanying drawings,

FIGURE 1 is a view in side elevation showing one form of device which may be utilized in conjunction with the method embodying my invention;

FIGURE 2 is a view similar to FIGURE 1 and rotated 90 degrees therefrom with a fishing line operatively associated therewith to illustrate the initial step in my method of applying a sinker to the line;

FIGURE 3 is a longitudinal axial sectional view taken on the line 3—3 of FIGURE 1 and illustrating the second step in applying the sinker to the line;

FIGURE 4 is an enlarged view of the device in end elevation; and

FIGURES 5, 6, 7, 8 and 9 are fragmentary pictorial views illustrating successive steps to complete the application of the sinker to the line.

Referring specifically to the drawings, a form of device which may be employed in practicing the method embodying my invention comprises a support in the form of an open ended cylindrical barrel 10, one end of which is closed by a plug 11 having a flange 12 seating against the end of the barrel. An actuator in the form of a pin 13 is freely reciprocable in a bore 14 through the plug 11 and is provided with a head 15 engageable with the inner end of the plug to limit the axial movement of the pin outwardly of the plug.

Working in the barrel 10 is a line attaching member in the form of a rod 20 approximating the length of the barrel. The rod 20 is provided with a flanged collar 21 at one end and with a line receiving notch or hook 22 adjacent to its other end which latter is tapered to a blunt point as indicated at 23. Fixed to collar 21 is one end of a coil spring 24 which freely surrounds the rod and is of a length when unloaded, to approximate the length of the rod.

The rod 20 is of a diameter to freely pass through the longitudinal passage 25 of a conventional form of sinker S so as to enable a number of the sinkers to be mounted on the rod with the innermost sinker bearing against the free end of the spring 24 which is increasingly loaded as sinkers are applied to the rod. Fastened to the barrel 10 adjacent to its open end is a collar 30 from which extends at diametrically opposed locations resilient or spring arms 31 the free ends of which are disposed beyond the open end of the barrel and are provided with stop elements or jaws 32 urged towards each other by the arms.

The jaws 32 co-act with the outermost or leading sinker S on the rod 20 in releasably retaining the sinkers on the rod with the outermost sinker beyond the end of the barrel on the free end portion of the rod. Each of the elements 32 is constructed to provide spaced stop portions 32a having rounded cam surfaces 32b which engage the periphery of the outermost sinker at circumferentially spaced locations, with the sinker conveniently accessible for grasping between the fingers when it is desired to remove a sinker for use on the fishing line. A suitable spring clip 35 is provided on the barrel 10 to enable the device to be carried on the person.

The use of the device in conjunction with the method embodying my present invention is as follows:

In carrying out my method, the barrel 10 is held in one hand while a finger thereof depresses the actuator 13 so as to project the free end portion of the rod 20 from the outermost sinker S and expose the notch 22 as shown in FIGURE 2.

The fishing line is now hooked into the notch 22 at the location on the line at which a sinker is to be applied, and the line held taut as the actuator is released to enable the hooked portion of the line to be drawn into the passage 25 of the outermost sinker by the rod 20 under the urging action of the spring 24 as shown in FIGURE 3.

The outermost sinker is now grasped between the fingers and pulled axially past the stop elements 32 by camming the latter outwardly against the urging action of the arms 31, thus leaving a bight portion of the line connected to the rod and threaded through the passage 25 of the removed sinker as the next succeeding sinker in the barrel is advanced by the spring 24 into engagement with the stop elements 32 as shown in FIGURE 5.

The actuator is again depressed to expose the notch 22 from which the bight portion of the line is now disengaged and opened to enable the sinker on the line L to be easily passed through the bight as shown in FIGURE 7, following which the line is pulled through the sinker to reduce the size of the bight as shown in FIGURE 8 until the bight is finally pulled tightly against the side of the sinker as shown in FIGURE 9, yet enable the sinker to be instantly removed from the line by reversing the steps of FIGURES 7, 8 and 9.

From the foregoing description, it will be manifest that the method embodying my invention enables the fisherman to have a supply of sinkers conveniently at hand and to apply one or more sinkers to the line at any location along the length thereof with the utmost ease and dispatch, yet enable the sinkers to be easily removed from the line without damaging either line or sinkers.

I claim:
1. The method of applying a sinker having a line receiving passage therethrough to a fishing line by utilizing a device having a sinker mounting member provided with line attaching means, which comprises: connecting a bight portion of the fishing line to said attaching means; withdrawing the sinker from the member while the bight portion remains connected to the attaching means so that the sinker will be transferred from the member to a doubled portion of the line; disconnecting the bight portion from the attaching means; and passing the sinker through the bight portion and holding the sinker while pulling upon the line until the bight portion is drawn tightly around the doubled portion of the line and against the sinker so as to secure the sinker to the line.

2. The method of applying a sinker having a line receiving passage therethrough to a fishing line by utilizing a device having a rod-like member provided with line attaching means, on which member a sinker is releasably retained with the member being manually movable relative to the sinker from a retracted position to an advanced position wherein said attaching means will be exposed beyond the sinker which comprises: connecting a bight portion of the fishing line to said attaching means when said member is moved to its advanced position so that upon movement of the member to its retracted position said bight portion will be drawn into the sinker; manually withdrawing the sinker from said member while said bight portion remains connected to the attaching means; disconnecting the bight portion from the attaching means; and passing the sinker through the bight portion and holding the sinker while pulling upon the line until the bight portion is drawn tightly around the line and against the sinker so as to secure the sinker to the line.

References Cited in the file of this patent

UNITED STATES PATENTS

| | | |
|---|---|---|
| 2,038,108 | Henley | Apr. 21, 1936 |
| 2,753,652 | Romaine | July 10, 1956 |
| 2,978,800 | Blain | Apr. 11, 1961 |